United States Patent
Modica et al.

(10) Patent No.: US 11,721,205 B2
(45) Date of Patent: Aug. 8, 2023

(54) METHOD, APPARATUS, AND COMPUTER PROGRAM PRODUCT FOR PROCESSING SENSOR DATA

(71) Applicant: HERE Global B.V., Eindhoven (NL)

(72) Inventors: Leo Modica, Sawyer, MI (US); Chris Palm, Naperville, IL (US); Kaushik Vakharia, Naperville, IL (US); Eric Linder, Downers Grove, IL (US); Dejan Milojkovic, Hoffman Estates, IL (US); Eugene Rabinovich, Northbrook, IL (US); Dietmar Rabel, Frankfurt am Main (DE); Prokop Jehlicka, Oberursel (DE); Harini Anand, Hawthorn Woods, IL (US); Dave Furchtgott, Chicago, IL (US); Catalin Capota, Palatine, IL (US)

(73) Assignee: HERE GLOBAL B.V., Eindhoven (NL)

( * ) Notice: Subject to any disclaimer, the term of this patent is extended or adjusted under 35 U.S.C. 154(b) by 243 days.

(21) Appl. No.: 15/617,382

(22) Filed: Jun. 8, 2017

(65) Prior Publication Data
US 2017/0358204 A1 Dec. 14, 2017

Related U.S. Application Data

(60) Provisional application No. 62/349,315, filed on Jun. 13, 2016.

(51) Int. Cl.
*G08G 1/01* (2006.01)
*G07C 5/08* (2006.01)
(Continued)

(52) U.S. Cl.
CPC ........ *G08G 1/0112* (2013.01); *G01C 21/3811* (2020.08); *G07C 5/008* (2013.01);
(Continued)

(58) Field of Classification Search
None
See application file for complete search history.

(56) References Cited

U.S. PATENT DOCUMENTS 6,580,983 B2 * 6/2003 Laguer-Diaz ........... B61L 3/125
701/31.4
9,406,222 B2 * 8/2016 Hergesheimer .......... H04Q 9/00
(Continued)

FOREIGN PATENT DOCUMENTS

EP 3226225 A1 * 10/2017 ....... G08G 1/096775

*Primary Examiner* — David P. Merlino
(74) *Attorney, Agent, or Firm* — Peter H. Yu; Here Global B.V.

(57) ABSTRACT

A method is provided that includes: receiving a plurality of estimated position points, each estimated position point including a timestamp, where each estimated position point is an estimate of a position of a vehicle at a time respective timestamp; receiving on or more path events, where each of the one or more path events includes a timestamp and data from at least one sensor of the vehicle; generating a path from the plurality of estimated position points, where the estimated position points are arranged in order of ascending time represented by the respective timestamp; and interpolating between two of the estimated position points to determine a location corresponding to one of the one or more path events, where the timestamp of the one of the one or more path event corresponds to a time that is between the times represented by the timestamps of the two estimated position points.

15 Claims, 14 Drawing Sheets

(51) Int. Cl.
*H04W 4/021* (2018.01)
*H04W 4/029* (2018.01)
*H04W 4/024* (2018.01)
*G07C 5/00* (2006.01)
*G01C 21/00* (2006.01)
*H04W 4/48* (2018.01)
*H04W 4/70* (2018.01)
*G06V 20/56* (2022.01)

(52) U.S. Cl.
CPC ......... *G07C 5/0841* (2013.01); *G08G 1/0129* (2013.01); *G08G 1/0133* (2013.01); *G08G 1/0141* (2013.01); *H04W 4/021* (2013.01); *H04W 4/024* (2018.02); *H04W 4/029* (2018.02); *G06V 20/56* (2022.01); *H04W 4/48* (2018.02); *H04W 4/70* (2018.02)

(56) References Cited

U.S. PATENT DOCUMENTS

| | | | |
|---|---|---|---|
| 2005/0131595 A1* | 6/2005 | Luskin | G06Q 50/30 701/31.4 |
| 2006/0194566 A1* | 8/2006 | Oesterling | H04M 11/04 455/404.1 |
| 2006/0224288 A1* | 10/2006 | Mattes | G01P 15/18 180/282 |
| 2007/0185646 A1* | 8/2007 | Neugebauer | G07C 5/008 701/533 |
| 2009/0267834 A1* | 10/2009 | Dooley | G01S 5/0036 342/357.57 |
| 2013/0261954 A1* | 10/2013 | Boschker | G01C 21/00 701/410 |
| 2014/0049393 A1* | 2/2014 | Boyt | G01S 5/0284 340/540 |
| 2015/0161886 A1* | 6/2015 | Kesting | G08G 1/012 701/117 |
| 2015/0197207 A1* | 7/2015 | Clark | B60R 21/0136 701/1 |
| 2015/0254781 A1* | 9/2015 | Binion | G07C 5/0858 701/32.2 |
| 2016/0179874 A1* | 6/2016 | Lynch | G06F 16/2379 707/690 |
| 2016/0293000 A1* | 10/2016 | Torgerson | G08G 1/0112 |
| 2016/0362075 A1* | 12/2016 | Dlagnekov | G01P 15/00 |
| 2017/0076396 A1* | 3/2017 | Sudak | G07C 5/085 |
| 2019/0156062 A1* | 5/2019 | Busser | G06Q 50/30 |

\* cited by examiner

| | |
|---|---|
| Name | timeStampUTC_ms |
| Unit | ms ( = seconds/1.000) |
| Range | [ 0; ∞ [ |
| Resolution | 1ms |

305

| | |
|---|---|
| Name | longitude_deg |
| Unit | degrees |
| Range | [ -180; 180 [ |
| Resolution | <= 0.00001 deg |

310

| | |
|---|---|
| Name | latitude_deg |
| Unit | degrees |
| Range | [ -90; 90 [ |
| Resolution | <= 0.00001 deg |

| Enum Value | Vehicle Type | Description |
|---|---|---|
| 1 | BUS | A bus |
| 2 | DELIVERY_TRUCK | A delivery truck (typically a smaller truck) |
| 3 | EMERGENCY_VEHICLE | For example an ambulance, police, fire-truck or similar which is allowed to break normal traffic rules |
| 4 | MOTORCYCLE | A motorcycle |
| 5 | PASSENGER_CAR | A passenger car |
| 6 | TAXI | A taxi |
| 7 | TRANSPORT_TRUCK | A transport truck (typically a larger truck) |

/— 425

| Light State | Bit | Description |
|---|---|---|
| LOWBEAMS | 0 | The low beam light |
| HIGHBEAMS | 1 | The high beam light |
| FOGLAMP_FRONT | 2 | The front fog light |
| FOGLAMP_REAR | 3 | The rear fog light |
| HAZARD | 4 | Hazard lights are on (e.g. both turn lights blinking) |
| LEFT_TURN | 5 | Left Turn indicated activated |
| RIGHT_TURN | 6 | Right Turn indicator activated |

FIG. 6

| Light State | Bit | Description |
|---|---|---|
| WARNING_ENGINE_CONTROL | 0 | Warning that the engine has sent a DTC. |
| WARNING_OIL_PRESSURE | 1 | Warning of Oil pressure is on |
| WARNING_COOLANT_TEMP | 2 | Warning of too high coolant temperature or malfunctioning coolant systems |
| WARNING_VEHICLE_SERVICE | 3 | Indicates that the service warning light is on any module indicates that it needs service (e.g. malfunctioning) |
| WARNING_BATTERY_CHARGING | 4 | Indicates that the battery charging alert is on. |
| WARNING_TIRE_PRESSURE | 5 | Indicates that the tire pressure alarm is on. |
| WARNING_LAMP_OUT | 6 | Indicates that one or more light bulbs may not be illuminated |
| WARNING_OTHER_HIGH_PRIO | 7 | Other than stated warning is lit. The priority is high and the vehicle should be stopped as soon as possible |
| WARNING_OTHER_LOW_PRIO | 8 | Other thatn stated warning is lit. The priority is normal. No immediate stop is required. |

FIG. 7

| Enum Position | Light Condition Type | Description |
|---|---|---|
| 1 | GENERAL_DAYLIGHT | Describing light environment |
| 2 | GENERAL_DARK | Describing dark environment (usually lights are turned on) |
| 3 | DAYLIGHT_SUN | Describing daylight with sun shining conditions |
| 4 | DAYLIGHT_CLOUD | Describing daylight with diffuse light conditions |
| 5 | DUSK_OR_DAWN | Describing a halfway light and dark situation with intermediate visibility |
| 6 | NIGHT_LUMINATED | Describing a night situation with illumination (tunnel or urban areas) |
| 7 | NIGHT_DARK | Describing a night situation with no illumination of the road and surrounding |

FIG. 8

| Element | Description | Mandatory or Optional |
|---|---|---|
| $N_1$ x VehicleStatus | Vehicle status has various elements describing the status of the vehicle. | Optional |
| $N_2$ x VehicleDynamics | Vehicle dynamics has various elements describing the dynamic movements of the vehicle. Vehicle Dynamics Path Events may be present at a much higher frequency than any other event and also at higher frequency than Position Estimates | Optional |
| $N_3$ x SignRecognition | Information about a recognized (or missing) road sign | Optional |
| $N_4$ x LaneBoundaryRecognition | Information about a recognized lane boundary | Optional |
| $N_5$ x ExceptionalVehicleState | Information about an exceptional vehicle state | Optional |
| $N_6$ x ProprietaryInfo | OEM specific proprietary data typically only used by Platform as a Service customers | Optional |
| $N_7$ x EnvironmentStatus | Information about the environment | Optional |
| $N_8$ x ObjectDetection | Identified position of objects (moving or static) | Optional |
| $N_9$ x ADSensorAndServiceState | Information about the activated Sensors and Controls for AD-feature of the vehicle | Optional |
| $N_9$ x Fuel Event | Information about fuel state | Optional |

FIG. 12

METHOD, APPARATUS, AND COMPUTER PROGRAM PRODUCT FOR PROCESSING SENSOR DATA

CROSS REFERENCE TO RELATED APPLICATIONS

This application is a non-provisional conversion of and claims priority to U.S. Patent Provisional Application Ser. No. 62/349,315, filed on Jun. 13, 2016, the contents of which are herein incorporated by reference in their entirety.

TECHNOLOGICAL FIELD

An example embodiment of the present invention relates to gathering and processing sensor data, and more particularly, to gathering and processing sensor data from a plurality of different sources using a plurality of different sequences and priorities, and using said data for the enhancement and creation of dynamic services.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. Further, dynamic map attributes such as route traffic, route conditions, and other dynamic map-related information may be provided to enhance the digital maps. However, disparate data sources may provide dynamic map-related information that is incompatible with a map service, and the data may be interpreted in an erroneous manner or discarded altogether, resulting in a loss of potentially beneficial information.

BRIEF SUMMARY

A method, apparatus, and computer program product are provided in accordance with an example embodiment for gathering and processing sensor data, and more particularly, to gathering and processing sensor data from a plurality of different sources using a plurality of different sequences and priorities, and using said data for the enhancement and creation of dynamic services. In an example embodiment, a method is provided that includes: receiving a plurality of estimated position points, each estimated position point including a timestamp, wherein each estimated position point is an estimate of a position of a vehicle at a time represented by a respective timestamp; receiving on or more path events, where each of the one or more path events includes a timestamp and data from at least one sensor of the vehicle; generating a path from the plurality of estimated position points, where the estimated position points are arranged in order of ascending time represented by the respective timestamp; and interpolating between two of the estimated position points to determine a location corresponding to one of the one or more path events, where the timestamp of the one of the one or more path event corresponds to a time that is between the times represented by the timestamps of the two estimated position points.

According to some embodiments, a path event includes a sensed vehicle status, environmental condition, or vehicle dynamic event. Methods may include aligning the path with a map representing the geography of available vehicle routes. Receiving a plurality of estimated position points may include: receiving a plurality of estimated position points for a complete drive cycle in response to no path events requiring near real-time submission; and receiving a plurality of estimated position points for a subset of a drive cycle in response to a path event requiring near real-time submission. Path events may include changes to at least one of vehicle status, vehicle dynamics, or environmental status, or at least one of a sign recognition event, lane boundary recognition event, exceptional vehicle event, or object detection event. The plurality of estimated position points and the one or more path events may be received in a vehicle sensor data submission message, where the vehicle sensor data submission message comprises vehicle identifying information. Methods may include anonymizing the vehicle sensor data submission message. Anonymizing the vehicle sensor submission message may include dividing the plurality of estimated position points between a first path segment, a second path segment, and a gap path segment between the first path segment and the second path segment. Generating a path from the plurality of estimated position points may include generating a first path from the first path segment, generating a second path from the second path segment, and eliminating the gap path segment.

Embodiments of the present invention may provide an apparatus including at least one processor and at least one memory including computer program code. The at least one memory and the computer program code may be configured, with the processor, to cause the apparatus to at least: receive a plurality of estimated position points, each estimated position point including a timestamp, where each estimated position point is an estimate of a position of a vehicle at a time represented by the respective timestamp; receive one or more path events, where each of the one or more path events includes a timestamp and data from at least one sensor of the vehicle; generate a path from the plurality of estimated position points, where the estimated position points are arranged in order of ascending time represented by the respective timestamp; and interpolate between two of the estimated position points to determine a location corresponding to one of the one or more path events, where the timestamp of the one of the one or more path events corresponds to a time that is between the times represented by the timestamps of the two of the estimated position points. The path event may include a sensed vehicle status, environmental condition, or vehicle dynamic event.

According to some embodiments, the apparatus may further be configured to align the path with a map representing the geography of available vehicle routes. Causing the apparatus to receive a plurality of estimated position points may include causing the apparatus to: receive a plurality of estimated position points for a complete drive cycle in response to no path events requiring near real-time submission; and receive a plurality of estimated position points for a subset of a drive cycle in response to a path event requiring near real-time submission. Path events may include changes to at least one of vehicle status, vehicle dynamics, or environmental status, or at least one of a sign recognition event, lane boundary recognition event, exceptional vehicle event, or object detection event. The plurality of estimated position points and the one or more path events may be received in a vehicle sensor data submission message, where the vehicle data sensor submission message includes vehicle identification information. The apparatus may be configured to anonymize the sensor data submission message. The anonymization of the sensor data submission message may include causing the apparatus to divide the plurality of estimated position points between a first path segment, a second path segment, and a gap path segment between the first path segment and the second path segment, where causing the apparatus to generate a path from the plurality of estimated position points may include causing the apparatus to generate a first path from the first path segment, generate a second path from the second path segment, and eliminate the gap path segment.

A computer program product may be provided including at least one non-transitory computer-readable storage medium having computer-executable program code portions stored therein. The computer-executable program code portions may include program code instructions configured to: receive a plurality of estimated position points, each estimated position point including a timestamp, where each estimated position point is an estimate of a position of a vehicle at a time represented by the respective timestamp; receive one or more path events, where each of the one or more path events includes a timestamp and data from at least one sensor of the vehicle; generate a path from the plurality of estimated position points, where the estimated position points are arranged in order of ascending time represented by the respective timestamp; and interpolate between two of the estimated position points to determine a location corresponding to one of the one or more path events, where the timestamp of the one of the one or more path events corresponds to a time that is between the times represented by the timestamps of the two of the estimated position points. A path event may include a sensed vehicle status, an environmental condition, or a dynamic vehicle event.

According to some embodiments, the computer program product may include program code instructions configured to align the path with a map representing the geography of available vehicle routes. The program code instructions configured to receive a plurality of estimated position points may include program code instructions configured to: receive a plurality of estimated position points for a complete drive cycle in response to no path events requiring near real-time submission; and receive a plurality of estimated position points for a subset of a drive cycle in response to a path event requiring near real-time submission. Path events may include changes to at least one of vehicle status, vehicle dynamics, or environmental status, or at least one of a sign recognition event, lane boundary recognition event, exceptional vehicle event, or object detection event. The plurality of estimated position points and the one or more path events may be received in a vehicle sensor data submission message where the vehicle sensor data submission message includes vehicle identifying information. The computer program product may include program code instructions configured to anonymize the vehicle sensor data submission message.

A method may be provided according to example embodiments including: receiving sensor data from a vehicle; anonymizing the sensor data from the vehicle; determining, by a processor, if additional measures are to be taken with respect to the sensor data to protect privacy; redacting sensor data to generate redacted sensor data in response to determining that additional measures are to be taken with respect to the sensor data to protect privacy; providing the sensor data to a service provider in response to determining that no additional measures are to be taken with respect to the sensor data to protect privacy; and providing the redacted sensor data to the service provider in response to determining that additional measures are to be taken with respect to the sensor data to protect privacy.

According to some embodiments, anonymizing the sensor data may include eliminating data from the sensor capable of uniquely identifying the vehicle from which the sensor data came. The sensor data may include vehicle path data including data points having both location and time information. Redacting sensor data may include: eliminating at least a portion of the vehicle path data from the sensor data; generating a first new subset of the sensor data comprising vehicle path data from prior to the eliminated portion of the vehicle path data; and generating a second new subset of the sensor data comprising vehicle path data from after the eliminated portion of the vehicle path data. Methods may include: determining a priority of the sensor data from the vehicle; providing the sensor data or the redacted sensor data to the service provider without intentional delay in response to the priority of the sensor data being high; and buffering the sensor data or the redacted sensor data for providing to the service provider after introduction of an intentional delay in response to the priority of the sensor data being low. High priority sensor data may include data regarding a singular event, whereas low priority sensor data may include data representing a drive cycle.

The sensor data of some methods may include: a plurality of position estimates along a path, each position estimate including a timestamp; at least one path event, where the path event includes a timestamp; and where the method further includes interpolating between a position estimate corresponding to a time before the path event timestamp and a timestamp corresponding to a time after the path event timestamp to determine a position estimate for the path event.

An apparatus may be provided including at least one processor and at least one memory including computer program code. The at least one memory and the computer program code configured to, with the processor, to cause the apparatus to: receive sensor data from a vehicle; anonymize the sensor data from the vehicle; determine, by a processor, if additional measures are to be taken with respect to the sensor data to protect privacy; redact sensor data to generate redacted sensor data in response to determining that additional measures are to be taken with respect to the sensor data to protect privacy; provide the sensor data to a service provider in response to determining that no additional measures are to be taken with respect to the sensor data to protect privacy; and provide the redacted sensor data to the service provider in response to determining that the additional measures are to be taken with respect to the sensor data to protect privacy. Causing the apparatus to anonymize the sensor data may include causing the apparatus to eliminate data from the sensor data capable of uniquely identifying the vehicle from which the sensor data came. The sensor data may include vehicle path data, including data points having both location and time information.

According to some embodiments, causing the apparatus to redact sensor data may include causing the apparatus to: eliminate at least a portion of the vehicle path data from the sensor data; generate a first new subset of the sensor data including vehicle path data from prior to the eliminated portion of the vehicle path data; and generate a second new subset of the sensor data including vehicle path data from after the eliminated portion of the vehicle path data. The apparatus may further be configured to: determine a priority of the sensor data from the vehicle; provide the sensor data or the redacted sensor data to the service provider without intentional delay in response to the priority of the sensor data being high; and buffer the sensor data or the redacted sensor data for providing to the service provider after introduction of an intentional delay in response to the priority of the sensor data being low. High priority sensor data may include data regarding a singular event, where low priority sensor data may include data representing a drive cycle. The sensor data may include: a plurality of position estimates along a path, each position estimate including a timestamp; at least one path event where the path event includes a timestamp. The apparatus may be configured to interpolate between a position estimate corresponding to a time before the path event timestamp and a time stamp corresponding to a time after the path event timestamp to determine a position estimate for the path event.

A computer program product may be provided including at least one non-transitory computer-readable storage medium having computer-executable program code instructions stored therein. The computer-executable program code portions including program code instructions configured to: receive sensor data from a vehicle; anonymize the sensor data from the vehicle; determine, by a processor, if additional measures are to be taken with respect to the sensor data to protect privacy; redact sensor data to generate redacted sensor data in response to determining that additional measures are to be taken with respect to the sensor data to protect privacy; provide the sensor data to a service provider in response to determining that no additional measures are to be taken with respect to the sensor data to protect privacy; and provide the redacted sensor data to the service provider in response to determining that additional measures are to be taken with respect to the sensor data to protect privacy. The program code instructions configured to anonymize the sensor data may include program code instructions configured to eliminate data from the sensor data capable of uniquely identifying the vehicle from which the sensor data came. The sensor data may include vehicle path data including data points that have both location and time information.

According to some embodiments, the program code instructions configured to redact sensor data may include program code instructions configured to: eliminate at least a portion of the vehicle path data from the sensor data; generate a first new subset of the sensor data including vehicle path data from prior to the eliminated portion of the vehicle path data; and generate a second new subset of the sensor data including vehicle path data from after the eliminated portion of the vehicle path data. The computer program product may include program code instructions to: determine a priority of the sensor data from the vehicle; provide the sensor data or the redacted sensor data to the service provider without intentional delay in response to the priority of the sensor data being high; and buffer the sensor data or the redacted sensor data for providing to the service provider after introduction of an intentional delay in response to the priority of the sensor data being low. The sensor data may include a plurality of position estimates along a path, each position estimate including a timestamp, and at least one path event, where the path event includes a timestamp. The computer program product may further include program code instructions configured to interpolate between a position estimate corresponding to a time before the path event timestamp and a time stamp corresponding to a time after the path event timestamp to determine a position estimate for the path event.

BRIEF DESCRIPTION OF THE DRAWINGS

Figure 1:
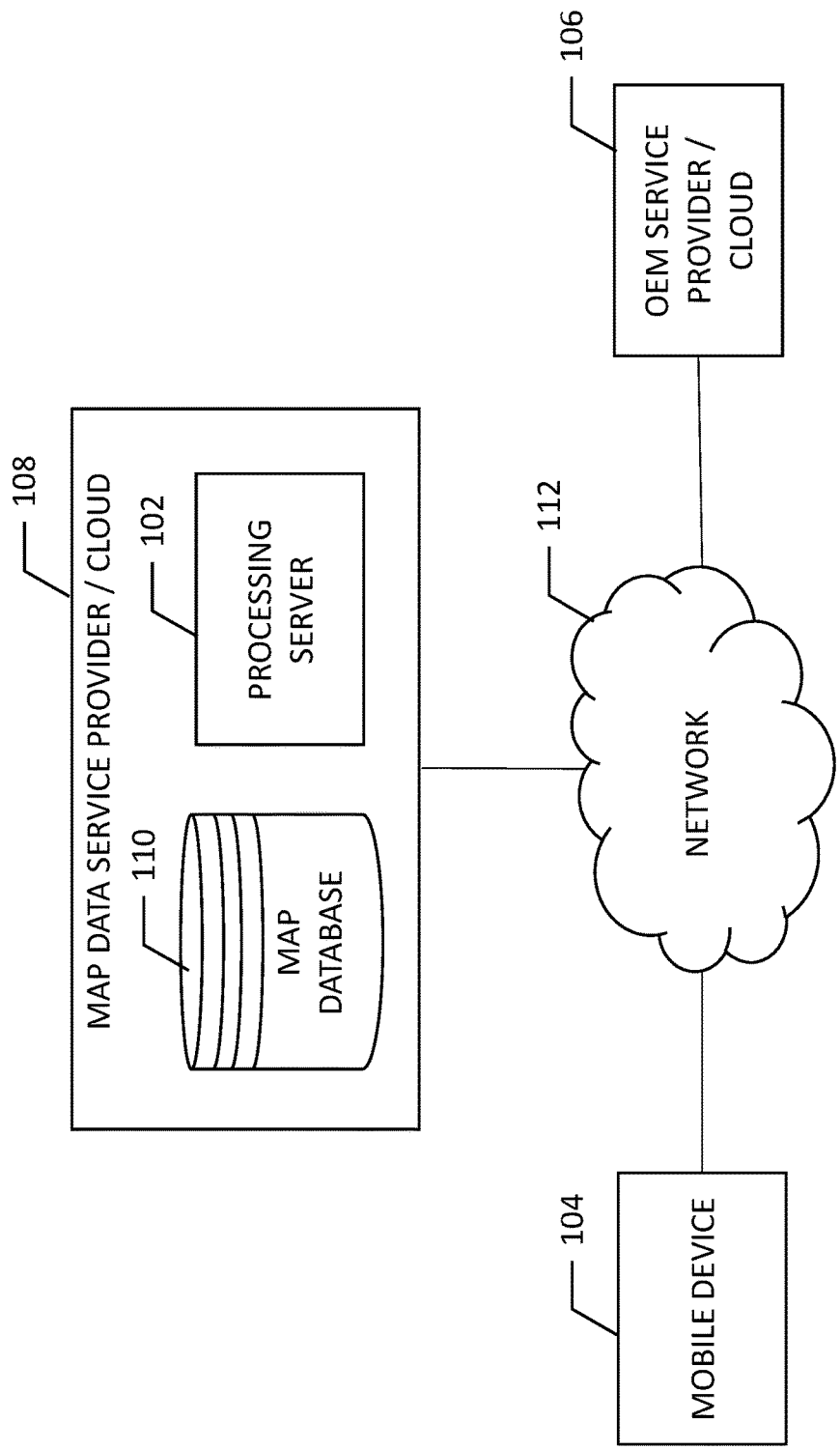
Figure 2:
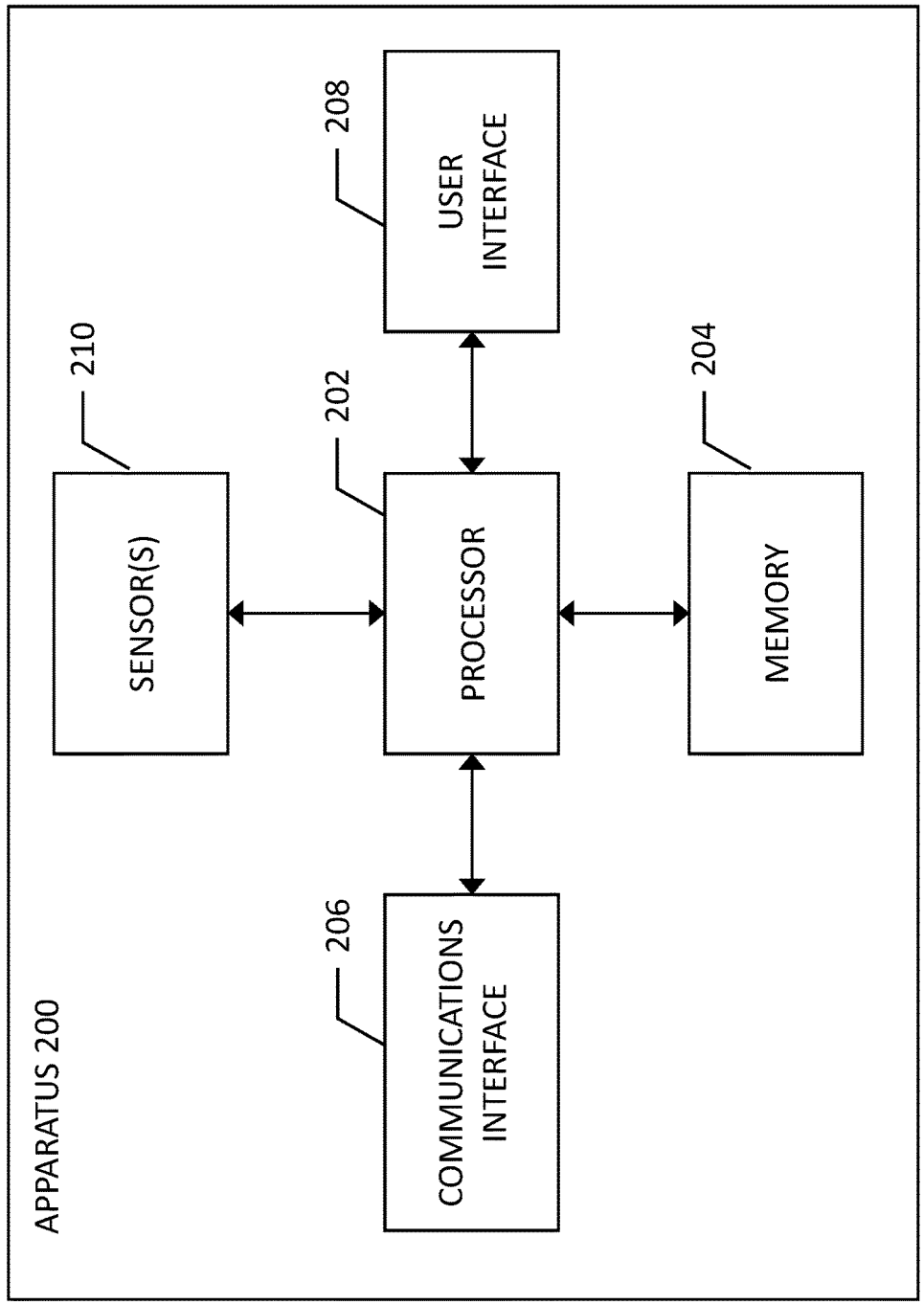
Figure 3:
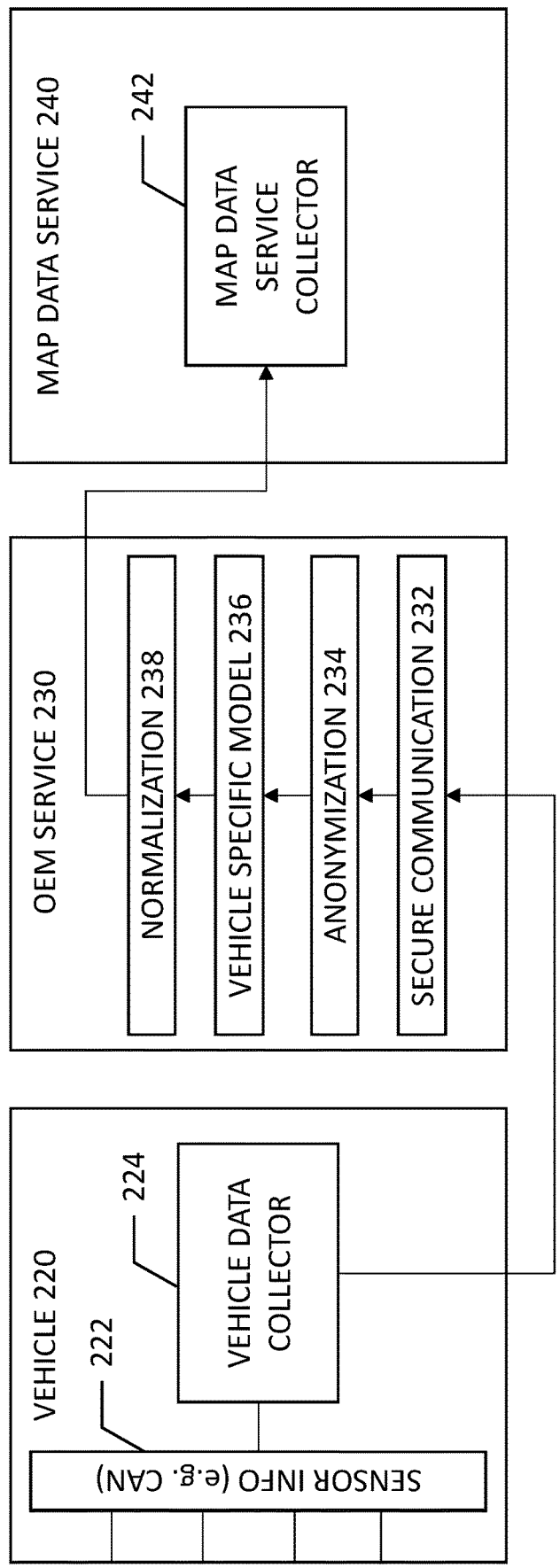
Figure 5:
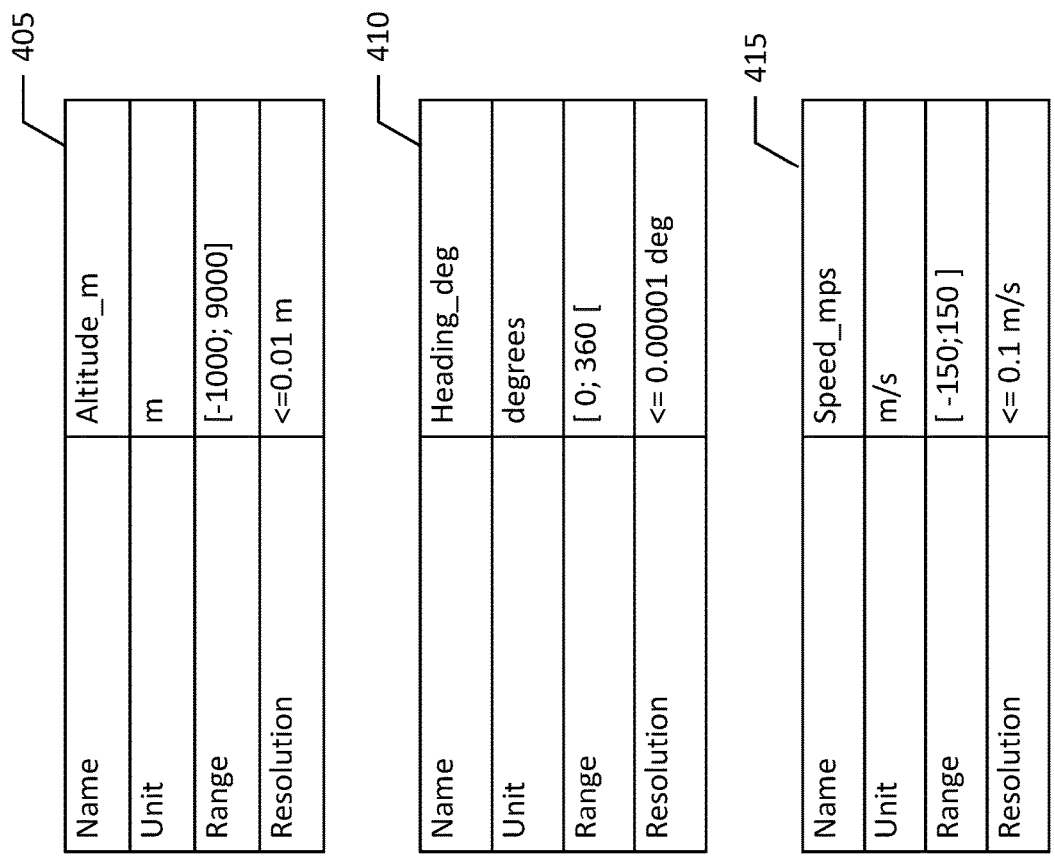
Figure 9:
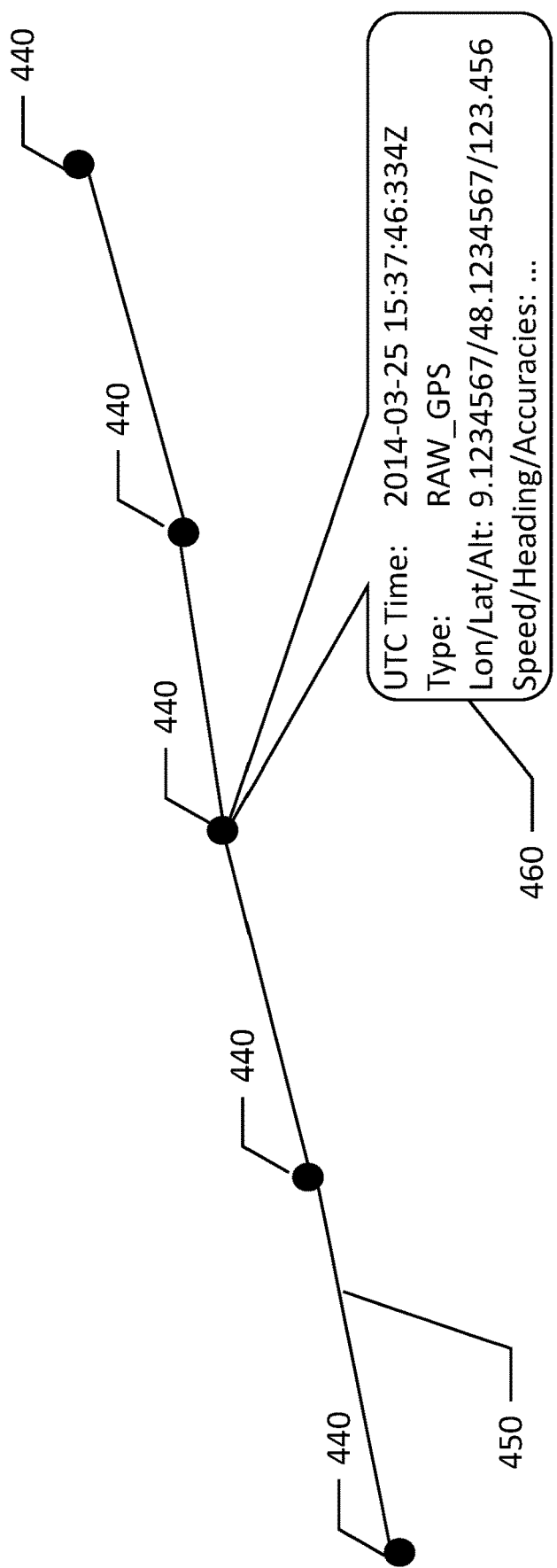
Figure 10:
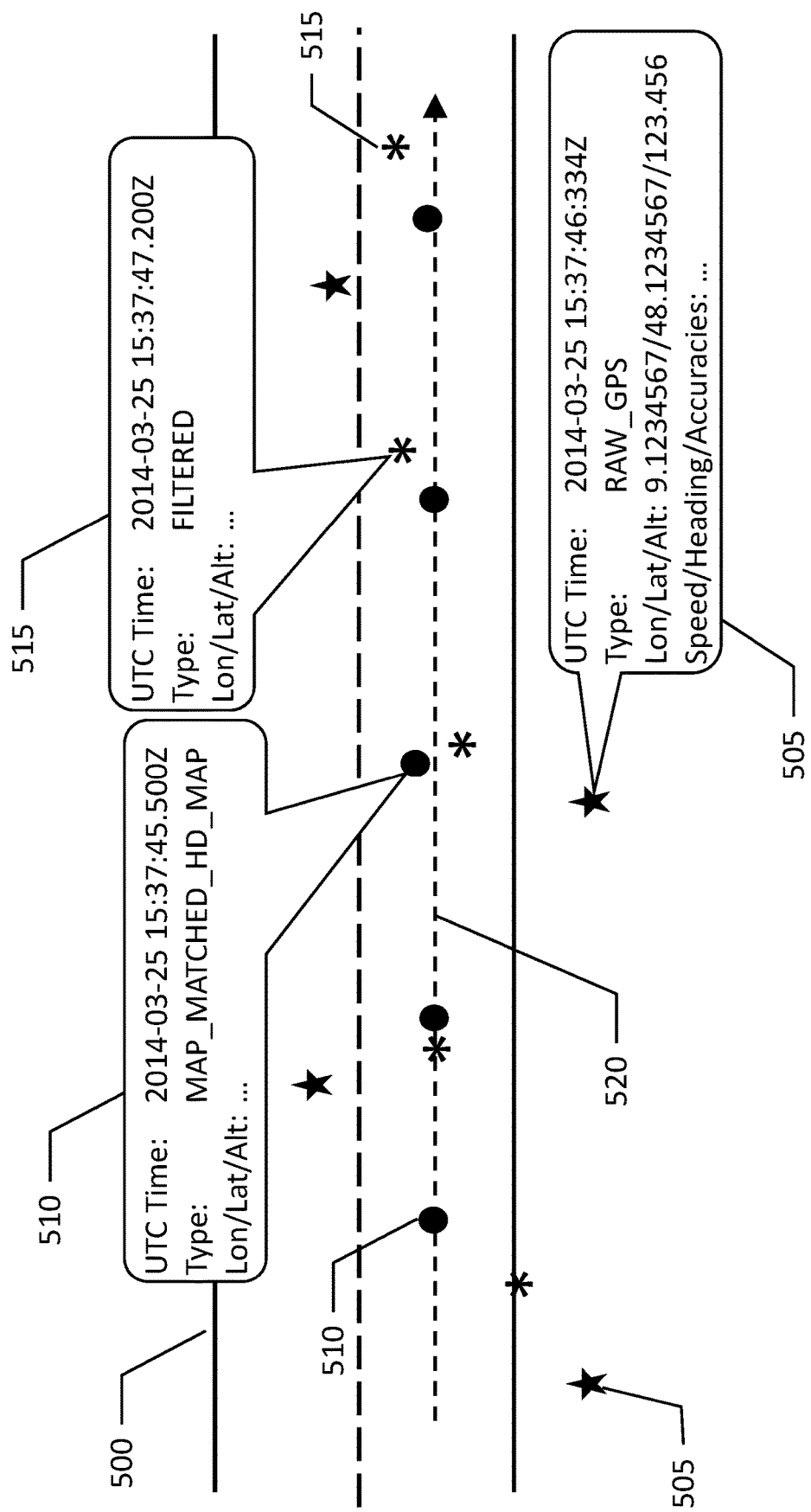
Figure 11:
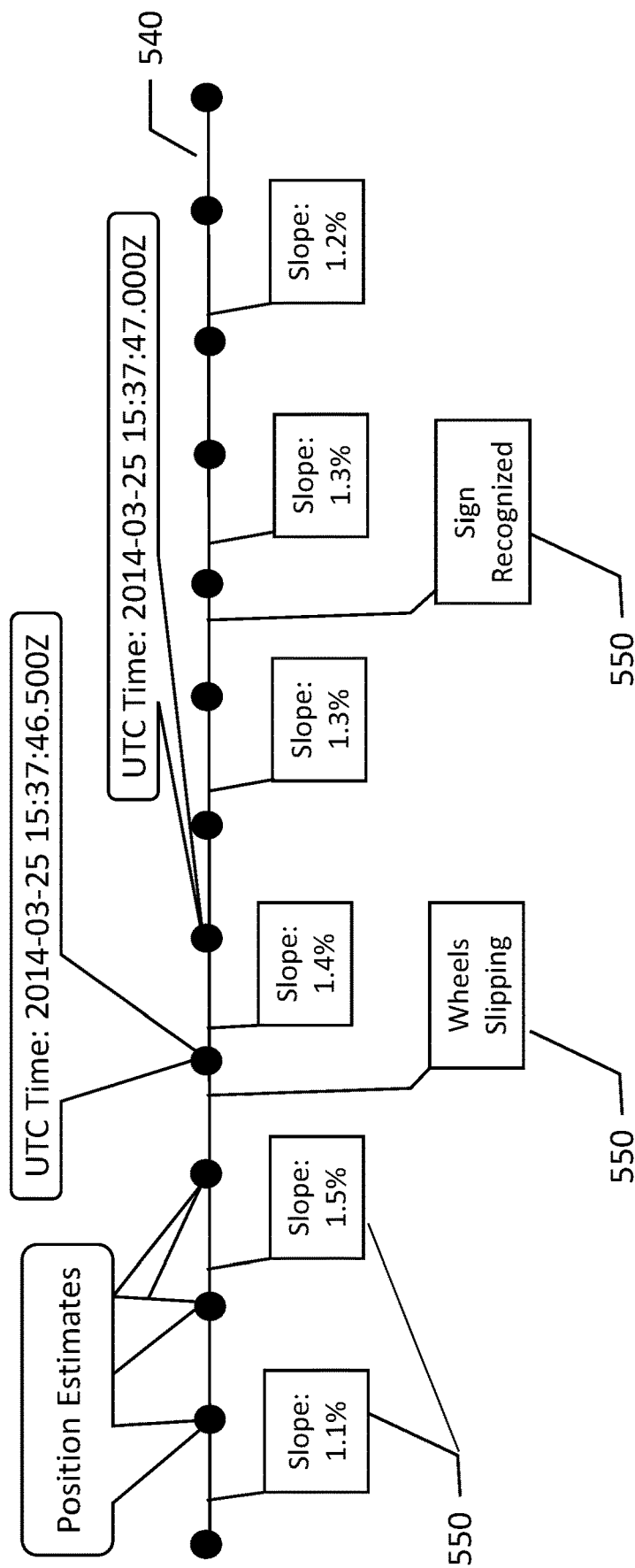
Figure 13:
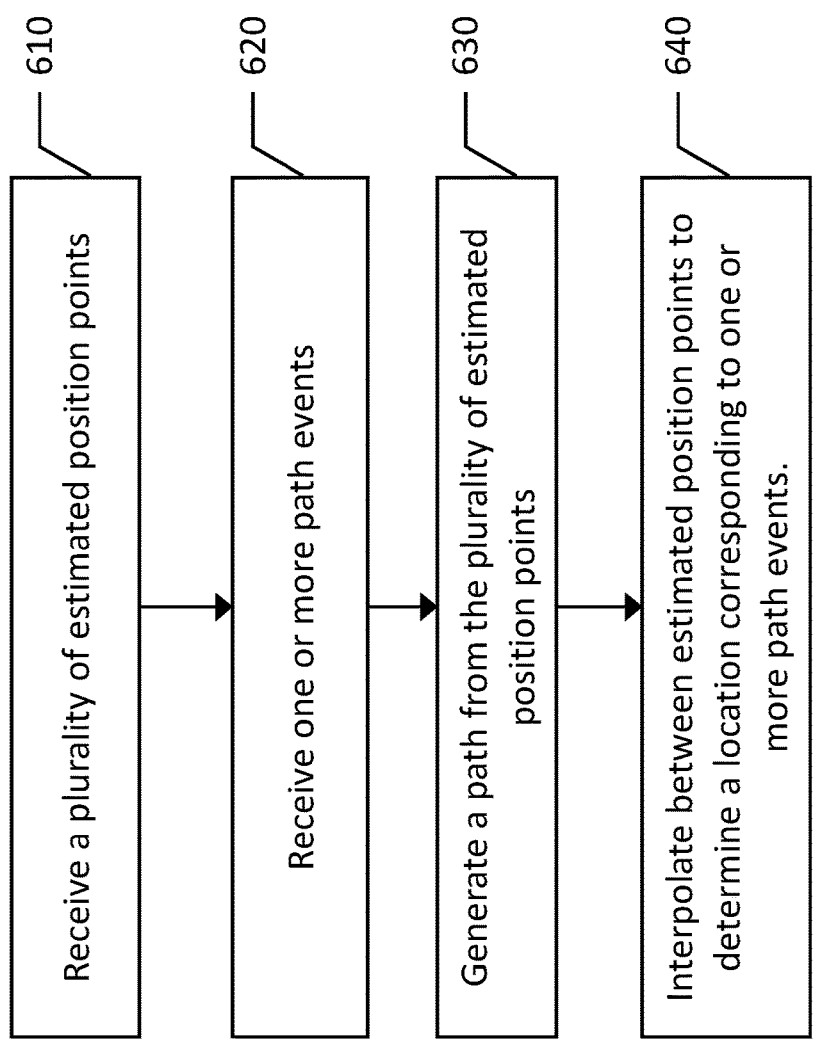
Figure 14:
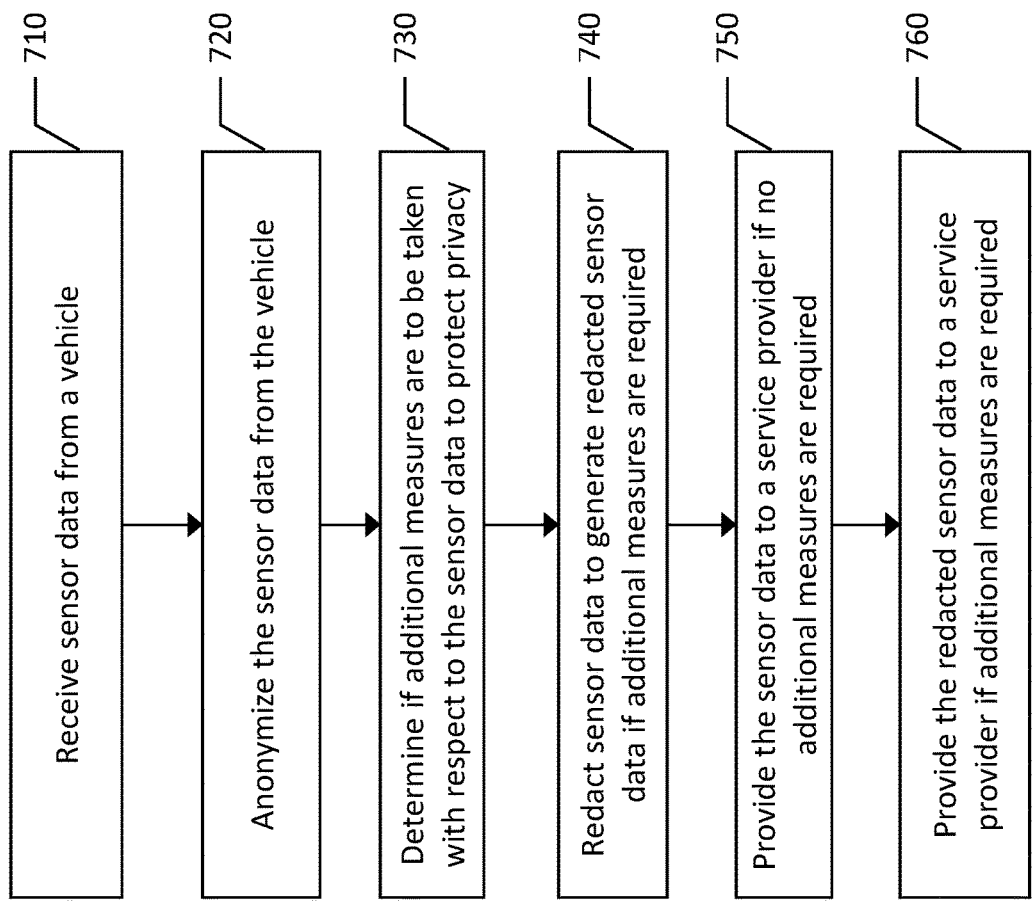

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for gathering sensor and path data in accordance with an example embodiment of the present invention;

FIG. 3 illustrates a message flow diagram of a vehicle sensor data submission message according to an example embodiment of the present invention;

FIG. 4 depicts an example embodiment of a timestamp data element, a longitude data element, and a latitude data element according to an example embodiment of the present invention;

FIG. 5 depicts an example embodiment of an altitude data element, a heading data element, and a speed data element according to an example embodiment of the present invention;

FIG. 6 depicts an example embodiment of a table with enumerated values for vehicle type and a table of a bit field value for a vehicle light status according to an example embodiment of the present invention;

FIG. 7 depicts an example embodiment of a table of a bit field value for a vehicle diagnostic code status according to an example embodiment of the present invention;

FIG. 8 depicts an example embodiment of a table with enumerated values for environmental light sensed according to an example embodiment of the present invention;

FIG. 9 illustrates a route including estimated position points along a path according to an example embodiment of the present invention;

FIG. 10 illustrates a route including estimated position points having different accuracies along a path according to an example embodiment of the present invention;

FIG. 11 illustrates path events and position estimates along a path according to an example embodiment of the present invention;

FIG. 12 depicts a table of various path event types and descriptions according to an example embodiment of the present invention;

FIG. 13 is a flowchart of a method for gathering and processing sensor data from a vehicle according to an example embodiment of the present invention; and FIG. 14 is a flowchart of another method for gathering and processing sensor data from a vehicle according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus, and computer program product are provided herein in accordance with an example embodiment for processing sensor data, and more particularly, to gathering and processing sensor data from a plurality of different sources using a plurality of different sequences and priorities, and using said data for the enhancement and creation of dynamic services. FIG. 1 illustrates a communication diagram of an example embodiment of a system for implementing example embodiments described herein. The illustrated embodiment of FIG. 1 includes a mobile device 104, which may be, for example, a vehicle including a vehicle data collecting device or system, an original equipment manufacturer (OEM) service provider or cloud service 106, and a map data service provider or cloud service 108. The mobile device 104 may be integrally connected to a vehicle data network operating via engine computer management (ECM) system, transmission computer management system (TCM), vehicle data system (VDS), etc. The mobile device may be configured to gather data related to a vehicle through any means appropriate. Each of the mobile device 104, OEM service provider 106, and map data service provider 108 may be in communication with at least one of the other elements illustrated in FIG. 1 via a network 112, which may be any form of wireless or partially wireless network as will be described further below. Additional, different, or fewer components may be provided. For example, many mobile devices 104 may connect with the network 112. The OEM service provider 106 and the map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region. Provided herein is a method, apparatus, and computer program product, to capitalize on the vast amounts of data available and to normalize the data to be able to maximize the information gathered from the data and provided to users of the map data service.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, the end user device or mobile device 104 can include an in-vehicle navigation system, such as an ADAS (advanced driver assistance system), a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of one or more personalized routes or route segments based on one or more calculated and recorded routes, according to some example embodiments. However, according to example embodiments provided herein, mobile device 104 may also be capable of gathering vehicle information (e.g. location, speed, etc.), and potentially more detailed information regarding a vehicle, such as data logging of brake pedal actuation, accelerator pedal actuation, windshield wiper use, hazard light use, headlight use, etc.

An example embodiment of a mobile device 104 may be embodied in an apparatus as illustrated in FIG. 2. The apparatus, such as that shown in FIG. 2, may be specifically configured in accordance with an example embodiment of the present invention for collecting vehicle data and sending to a service provider. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by mobile device 104. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an example embodiment of the present invention on a single "system on a chip." As such, in some cases, a chip or chipset may constitute a means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

The apparatus 200 of example embodiments may further include one or more sensors 210 for gathering information. Sensors may include global positioning system (GPS) sensors for identifying a mobile device 104 or vehicle location, sensors for determining speed and/or acceleration, sensors for determining ambient or environmental conditions, sensors for determining operational aspects of the vehicle (e.g., headlights, windshield wipers, on-board diagnostics (OBD), etc.). These sensors may gather data for sending to an OEM service provider and/or to a map data service provider as illustrated in FIG. 1. This data may be used for providing information regarding a route to other drivers, emergency personnel, traffic engineers, etc.

Example embodiments of the present invention provides an interface and a framework for submitting and receiving rich sensor data. The rich sensor data may be submitted to a map data services provider as messages with various types of content. Common to all kinds of submitted messages may be that they are related to one or a plurality of locations. Some of the sensor messages may be time critical and may be submitted in real time or substantially real time (e.g., no appreciable delay between receipt and submission). Delay in the submission of data may have large variances and may be in the range of seconds, to minutes, to weeks. Rich sensor data that is used for near real time event creation may be time critical such that it is submitted in substantially real time. Such information may include, for example, electronic stability program needs that may be of use to create warnings for other drivers traveling the same route.

Other sensor data may be used to update less time-sensitive information, such that a delay may be acceptable and in some cases, desirable. Some data may be collected over longer periods of time before being submitted to a map data services provider. Sensor data originating in road vehicles and submitted to the map data service provider may initially be submitted from the vehicle or mobile device 104 to an original equipment manufacturer (OEM) service provider interface where vehicle identification may be authenticated and data may be converted from raw sensor dependent generic information into meaningful, normalized sensor data. Further, consumer privacy considerations may be applied in the OEM service provider platform. The OEM service provider may then submit the data to the map data service provider.

As different vehicle manufacturers may operate their vehicles and vehicle networks using different, often proprietary software, and since sensor availability and data format can vary widely even within manufacturers, an OEM service provider platform may be used as an interface between mobile device 104 sensor data from vehicles and map data service provider 108. FIG. 3 illustrates a communication flow diagram of an example embodiment described herein. The sensor information is gathered from sensors in a vehicle 220, such as over a vehicle area network 222 or CAN. The sensor information may be communicated via wired or wireless sensors within the vehicle and a central processing unit within the vehicle may receive the sensor information or facilitate receiving and sending the sensor information at the vehicle data collector 224.

The vehicle sensor data may be sent from the vehicle 220, via a network communication protocol, to an OEM service 230. The sensor data may be received via secure communication at 232, and anonymized at 234. Anonymization may remove any information that would uniquely identify the vehicle from which the data came. The OEM may have various configurations including various types and configurations of sensors for each different vehicle model and/or trim levels of vehicles within the same model. At 236, the sensor data may be mapped to a vehicle specific model. The sensor data may be normalized at 238, such that any sensor data in proprietary format or non-standard format may be normalized to a common format. The normalized sensor data from the vehicle 220 may be provided to the map data service collector 242 of the map data service 240, where the data is processed and used to benefit other uses of the map data service.

In an example implementation, a vehicle may submit data through an OEM service provider interface as illustrated in FIG. 3, where vehicles are authenticated and data may be converted from raw sensor dependent generic information into meaningful normalized sensor data. Further, consumer privacy considerations may then be applied in the OEM service provider platform. The sensor interface described herein may be particularly beneficial as an interface between the OEM service provider 230 and the map data service provider 240.

Rich sensor data provided from the sensors to the vehicle data collector 224 may be submitted as vehicle data sensor submission messages with various types of content. Common to all submitted messages is that they may be related to one or multiple locations. Some of the sensor messages are time critical and are to be submitted to the OEM service provider in real-time or substantially real-time, with the OEM service provider sending the normalized, anonymized sensor data to the map data service provider with as little delay as possible, in substantially real-time. Other sensor data may be collected over a period of time in the vehicle and submitted with an intended delay. Such delay may have large variances and may be seconds, minutes, days, or weeks, for example. Real-time, substantially real-time, and near-real time, may each be interpreted to mean that no delay is intentionally introduced between receipt of the data and either processing the data or sending the data to another service provider. While real-time is ideally immediate, network latency and communication protocol delays may cause real-time information to be received with a slight delay, though not one that is intentionally introduced. As such, real-time, substantially real-time, and near real-time, may each be interpreted herein to mean as quickly as possible.

Rich sensor data that is used for substantially real-time event creation in a map data service provider 240 is time critical and thus should be submitted in near real-time. For example, information that is related to vehicle electronic stability, such as excessive wheel slip or anti-lock braking engagement, may be submitted in substantially real-time to create warnings for other drivers, such as drivers that are following the same route as the vehicle providing the sensor data. Other sensor data may be used to update information that is not as time-critical, such as traffic flow patterns which may change over time through the opening and closure of lanes, access roads, etc. The time criticality of such information may be much lower and therefore the data may be collected over a longer period of time before it is submitted to the map data service provider.

The delay or accumulation of sensor data may take place at the vehicle 220, such as by buffering vehicle sensor data in a memory, such as memory 204 of apparatus 200, or may occur at the OEM service provider 230. When sensor data is buffered at the vehicle 220, the sensor data may await transmission to the OEM service provider until an efficient data transmission protocol is available to the vehicle. For example, a vehicle may be configured to communicate via a WiFi network of a home when parked in the driveway. The vehicle may accumulate non-time-critical sensor data throughout a day or during a trip away from the home. Upon returning to the home and the vehicle once again becomes connected to the WiFi network, the buffered vehicle sensor data may be transmitted to the OEM service provider 230. As noted, any available communication protocol may be used for transmitting vehicle sensor data; however, the criticality of the timing of the data may be considered together with the efficiency and potential cost of the transmission of the vehicle sensor data before the data is transmitted to maximize data efficiency. Further, sensor data that is not time-critical may be configured to be communicated to the OEM service provider during a period of low bandwidth consumption, such as during the night (e.g., 2 a.m. to 5 a.m.), for example.

Sensor data sent in vehicle sensor data submission messages in near real-time and those that are delayed may use the same data elements. These data elements may be grouped in different combinations. The encoding mechanism and transport mechanism may be the same for sensor data messages whether they are real-time messages or delayed messages.

The messages including the vehicle sensor data may include data elements, logical data model, encoding, and transport specifications. The data elements may be simple data elements and structures including ranges and enumeration of the sensor data. The logical data model may include the logical combination of data elements and the layout of the messages to be sent to the OEM service provider. The encoding specification may specify the serialization and compression of data for transmission, while the transport specification may specify the actual data submission, protocols, and authentication.

Data Elements

Critical to example embodiments of the present invention, data elements from the sensor data may be collected at the vehicle and provided in messages to the OEM service provider. All of the data elements may have units according to the International System of Units (SI). However, data elements may use metric units in other example embodiments as necessary.

One data element that is necessary for context is a timestamp data element, as depicted in element 305 of FIG. 4. A timestamp is used to indicate an absolute time value. All timestamps used in any of the sensor ingestion application programming interface (API) may be based on UTC, or the coordinated universal time. The timestamps may be measured in milliseconds as used in the UTC since Jan. 1, 1970. In the context of sensor data collection, a global positioning system (GPS) time may be used during data collection. GPS time may be different from UTC, as historically GPS time has been sixteen seconds ahead of UTC. The vehicle or the OEM service provider may convert any non-standard UTC timestamp to a UTC timestamp before submitting the data to the map data service provider 240 to ensure consistency among all data received by the map data service provider. This timestamp normalization may be performed as shown at 238 of FIG. 3. The timestamp should be consistent at all times throughout all event messages. The timestamp represents the point of time at which the sensor data has been captured and not the time at which the sensor data is available. By way of example, a position estimate of a time t=0 is made available at t=1 and a map matching algorithm provides a matched position at t=5, then the map matched position estimate is provided as sensor data at t=6 with the data content "t=0".

Another data element that may be included in data collected by a vehicle data collector is a position offset. The position offset may be a position delta from a vehicle reference point to the location of the sensor determining the position of the vehicle, such as a Global Positioning System (GPS) sensor if using GPS for location. The position offset data element may have a variety of optional data elements within the position offset, such as a lateral offset, a longitudinal offset, and a vertical offset, for example. The position offset may optionally include an accuracy measure of the location, such as a lateral, longitudinal, and vertical accuracy measure. This accuracy, together with the offsets, may provide an indication of the position of a vehicle reference point and a measure of confidence based on the accuracy, or a radius defining a high degree of confidence of the position of the vehicle.

Data elements may include a wheel reference bit field which may be a bit field referencing a combination of the four wheels of a four-wheeled vehicle. A vehicle equipped with three or more axles may use only the foremost and rearmost axles, and outermost wheels of those axles, as the four reference points. Further, a vehicle equipped with a trailer may reference only the towing vehicle. The bit field identifiers may correspond to the four wheels used for reference, such as bits 0, 1, 2, and 3, corresponding to front axle left, front axle right, rear axle left, and rear axle right, respectively.

A three-dimensional vector may be included as a data element. The three dimensional vector may be used for any data requiring a three dimensional vector with optional accuracy, such as an acceleration vector. According to the ENU (East-North-Up) system, a value is positive in right, up, front direction and negative in left, down, rear direction. When representing rotations, the value represents the rotation along the named axis in angular speed with the rotation in mathematical positive direction facing the positive end of the axis represented by a positive value. From the vehicle reference point, increasing any dimension of a rotation vector results in a "yaw to the right" (heading), "roll to the left" (cross-slope), and "pitching to the front" (slope). Longitudinal value may refer to the front-rear-axis in the longitudinal direction, while the transverse value refers to the left-right axis, with vertical referring to the up-down axis. A three-dimensional vector may have three primary data elements, including a longitudinal value, transverse value, and vertical value to establish the vector. Optionally, the three dimensional vector data element may include longitudinal, transverse, and vertical accuracy measures also.

While the aforementioned data elements may be relatively standardized among various original equipment manufacturers, other data elements may be more vehicle or manufacturer specific. For example, data elements may include a version of the interface specification as a text value. This version may be used by the OEM service provider 230 for normalization of the data elements of the collected data, or may be used by the map data service provider 240 to discern data elements from the messages received from the OEM service provider. A submitter value may optionally be provided with the vehicle data messages, where the submitter value identifies a company (e.g., an OEM name or a system vendor name) that provides the data from the vehicle. This is not an individual vehicle identifier, but a service provider identifier. The same entity may use different values for the submitter text value for different purpose, such as production group, pre-development group, etc.

Data elements may include vehicle metadata. Vehicle metadata may include data objects referring to the vehicle that are not changing in usual driving conditions. These metadata elements may include items that uniquely identify a vehicle; however, the uniquely identifying elements of the metadata may be anonymized by the OEM service provider 230 at 234 as shown in FIG. 3. Vehicle metadata may include a vehicle type, such as a generic vehicle type (compact car, large car, sport utility vehicle, light truck, etc.). Metadata may optionally include vehicle dimensions (length, width, height, gross vehicle weight, fuel tank volume), vehicle characteristics (fuel type, standard fuel economy, etc.).

A transient vehicle identification may be included as a data element in the data message received from the vehicle. The transient vehicle ID may be held constant during a drive cycle of a vehicle such that data messages from that drive cycle may be "stitched" together to form a complete vehicle drive cycle and path. A transient vehicle ID may be maintained until the drive cycle is complete (e.g., the vehicle is switched off or parked for an extended period of time) and a new transient vehicle ID may be generated upon a new drive cycle starting.

Data elements may include a vehicle profile identification which may be a numeric and optional value that is unique for a vehicle. If the vehicle profile ID value is submitted, then each submission including the profile ID may be identifiable with the vehicle. This may enable the stitching of multiple submissions of a vehicle over a multitude of drive cycles. The vehicle profile ID may be provided to events, such as fuel events where fuel profile for a single vehicle can be analyzed and provided back to the single vehicle through a different interface. Optionally, a transient event ID may be provided for future referencing of a current sensor data message. This transient event ID may be included with reported sensor data enabling a past event and associated sensor data to be referenced.

Embodiments described herein may optionally include a persistent driver UUID (universally unique identifier) that is unique for a driver in a vehicle. In an embodiment with a persistent driver UUID value, each submission that includes that identifier may be uniquely associated with that user. This enables stitching together of multiple single submissions for a driver over a multitude of drives. The persistent driver UUID could be provided for events such as fuel events where the fule profile of a single driver could be analyzed and provided back to the vehicle through a different interface. Similarly, a persistent vehicle UUID may be unique for a vehicle. Each submission including this identifier could be associated uniquely with a specific vehicle. This may enable submissions from a vehicle to be stitched together over a multitude of drives. The persistent vehicle UUID could be provided for events such as fuel events where the fuel profile for the vehicle could be analyzed. A transient vehicle UUID may be a unique value that is submitted during the drive cycle of a single vehicle. This would enable stitching together of multiple smaller path submissions from the same transient vehicle UUID. However, the transient vehicle UUID would only be valid for a single drive cycle and cannot be associated with other drive cycles. A different drive of the same vehicle would receive a new transient vehicle UUID. Embodiments described herein may provide a submission configuration UUID that can be used to group individual submissions of sensor data. One or more submission configuration UUIDs can be sent along with the pertinent sensor data in a single message. A transient event UUID may be used to ensure that each event submitted has a singular, unique identifier which can be later referenced or associated with other data.

Different maps from different map providers may be used in different vehicles or on different devices, such that a map provider identifier may be provided to include the provider of the map installed in the vehicle or on the device. This identifier may be used, for example, in association with map-matched information such as a road link identifier or a map matched position. The version of the map may also be provided to determine the data of the map and appropriately match data with that specific version of the map data. A map standard parameter may be used to establish the format of the map installed in the vehicle or device.

Vehicle Path

Vehicle data may typically include a path, where the path includes one or more position estimates of the vehicle ordered by timestamp. The array of position estimates may include linear interpolatable locations. The position estimate data type may combine information related to the position of the vehicle. The position estimate may include a timestamp, position type, interpolated point, longitude, latitude, horizontal accuracy, altitude, heading (degrees), speed, altitude accuracy, heading accuracy, speed accuracy, speed detection type, heading detection type, and a current lane estimate, for example.

Path events may be complex data that includes information to notify the map data service provider 240 about detected events that the vehicle or OEM deduces from their raw sensor data. Every element in a path event may be a complex data type, and the data may be arranged in order of ascending timestamp. These data elements, which will be described further below, may include, for example: vehicle status, vehicle dynamics, sign recognition, lane boundary recognition, exceptional vehicle state, proprietary information, environment status, object detection, and a service and sensor state.

The vehicle status may combine information related to the status of various aspects of the vehicle. For example, the vehicle status may include a timestamp, transmission mode (e.g., which gear, torque converter lock state, etc.), light status (e.g., headlights on, bright beams on, etc.), windshield wiper state, windshield wiper speed, drive wheel reference (e.g., from the wheel reference bit field), chassis clearance, mileage, fuel state, fuel state accuracy, estimated range, etc.

Vehicle dynamics may include a time stamp, a curvature (e.g., determined by accelerometers and/or steering wheel position), slope or grade, travel range, travel accuracy, average gravity vector, etc.

Vehicles of example embodiments may be equipped with sensors that can detect environmental features, such as road signs. An image capture device may be implemented to interpret images of the environment and to determine if a sign is present in the environment representing the roadway ahead. The vehicle data from the vehicle data collector 224 may include sign recognition data. This data may include a time timestamp, road sign type, road sign permanency, road sign value, road sign validity (e.g., has it been tampered with?), road sign recognition type, recognition confidence, whether the sign is map-matched, whether the sign is unrecognized, sign size, shape, orientation, etc. Further, the road sign detection may be able to determine a value from the sign, such as a maximum speed limit, a maximum height or width, etc., as will be described further below.

Data may include lane boundary recognition as a data element. This data may include a timestamp, a position offset, a lane boundary type, a lane boundary color (e.g., yellow lines versus white lines on a roadway), curvature, lane marker width, lane marker width accuracy, lane boundary confidence, or the like. Lane recognition data may optionally include whether the lane is matched to a position on a map with a predetermined degree of certainty. Lane recognition data may include lane boundary recognition type in establishing whether the lane boundary was accurately detected or if there is a change in the lane boundary. The vertical curvature of a road or lane may be established based on the slope of the road with a positive curvature being up hill, and negative curvature being down hill.

The vehicle exceptional state may be a combination of information used to determine an exceptional vehicle state. Such states may be of rare nature and may typically indicate an irregular condition, such as tires slipping, crash detected, panic braking, etc. The data used to define an exceptional vehicle state may include a timestamp, a tire slippage event detection, crash detection, emergency braking event, electronic stability control event, antilock braking event, etc.

Proprietary information may optionally be provided in vehicle data from the OEM service provider 230. Such data may be submitted as key value pairs in string form for use by the map data service provider 240. Should binary data need to be transmitted, it may be converted using Base64 or other technologies in order to use the string key pair values.

Vehicle environment may optionally be reported in the vehicle data which may provide context for various other sensor data provided by the vehicle. Environment data elements may include, for example: light conditions, external air temperature, external air temperature accuracy, precipitation, visible distance, road surface temperature, road surface temperature accuracy, road surface type, precipitation type, precipitation volume, etc.

Similar to the sign recognition of vehicle data described above, vehicle data may optionally include object detection. Such detection may include data elements of a timestamp, a position offset, a three dimensional vector, an object type, object size, object size accuracy, etc.

Vehicle performance data and operational state may be included in vehicle data, such as speed control state, brake control state, steering control state, sign recognition state, lane recognition state, road surface sensor state, environmental sensor state, etc.

The road condition of a vehicle path may be determined as a parameter as a combination of information related to the outside environment. Road roughness, the duration of the roughness, the localization of the roughness, and the position of the road roughness may be reported. A boundary of the road may also be determined to aid in map generation or verification, and to benefit autonomous vehicle control. Information may be gathered and/or reported relating to a vehicle maneuver event, localization information, and various road attribute features (e.g., number of lanes, and confidence in the number of lanes). Information pertaining to the passenger environment may also be determined, such as the passenger count, which seats of a vehicle are in use, passenger infotainment use, etc.

Position Estimate

A position estimate, as noted above, contains at least the coordinates of the estimated position, and optionally additional data elements. The position estimate may include a timestamp, and a position type. The position type may be used to differentiate between different types of absolute positions. Position types may include: a raw GPS position with no map matching, filtering, or refinement; filtered GPS position including GPS data filtered of fused with inertial data, but not map-matched; map-matched including position based on sensors including GPS and inertial data, but not matched to a normal infotainment map database; map-matched including position based on sensors and matched to an infotainment map (e.g., from map data service provider) on centerline level; and map-matched lane-matched, where the position is matched to an infotainment map and the lane of travel is estimated with reasonable confidence. Position estimates may also include a flag to note whether the location is an interpolated point between two position estimates, or if it is a measured, recorded position.

In a position estimate, longitude is part of an absolute position. Longitude may be used for different position types, such as raw GPS position, fused position based on absolute and inertial measurements (dead reckoning), and map-matched positions. The reference system may be WGS84 (the 1984 World Geodetic System) and the required resolution may be to five decimal places or more. Wherever possible, a higher resolution such as seven decimal places is desirable. The longitude data element is depicted as element 310 in FIG. 4. Latitude follows the aforementioned definition of longitude, and is depicted as element 315 in FIG. 4.

The horizontal accuracy of a position estimate may be included as a data element of the data from a vehicle. The horizontal position may be a combination of the longitude and latitude, such that the horizontal accuracy position may provide a point location estimate with a first accuracy, and a radius about the point of a calculated distance having a greater accuracy. The resolution may be dependent upon the accuracy of measurement of the longitudinal and latitudinal positions.

Altitude may follow the definition of the longitude above and is depicted as element 405 in FIG. 5. The altitude may be based upon the WGS84 reference ellipsoid and not based on mean sea level. The altitude may be presumed to be the altitude at street level, not the altitude of the position of the GPS antenna; however, the position offset described above may account for any such variation. The GPS antenna may be, for example, on the roof of a vehicle, but the altitude offset defined in the vehicle metadata may ensure the altitude provided in the vehicle data is a street level altitude.

The heading of a vehicle may be included in the position estimate data and may have a unit of degrees measured from North at zero degrees, through East at 90 degrees, as depicted in element 410 of FIG. 5. The vehicle speed, which may be generated from raw GPS position over time, may be included in the position estimate data as depicted in element 415 of FIG. 5. Vehicle speed may not have a sign; however, vehicle speed may be attributed a sign based on vehicle heading and metadata indicating forward direction of the vehicle relative to travel. Vehicle data may optionally include altitude accuracy, heading accuracy, and speed accuracy, where each is established based on the sensor data reliability, accuracy, and resolution.

The data reported from the vehicle may include a speed detection type. For example, speed may be derived from two consecutive location determinations based on the timestamp. Another means for determining speed may be based on rotation of the vehicle wheels while determining rotation from a sensor, such as an anti-lock braking sensor on a toothed wheel, while knowing the circumference of the wheel. Speed may be determined based on the computer area network of the vehicle having transmission output shaft speed readings that combine with the differential gear ratio and the wheel/tire circumference to provide a speed measure. Optionally, speed may be derived from sonar or radar.

Vehicle heading as reported in vehicle data from the vehicle may be determined based on raw GPS data, magnetic sensor heading data (which may be combined with GPS data), driving distance, steering angle, or the like or heading derived from map data of the vehicle path, for example. The heading source or sensor(s) used to determine heading may be defined in the data from the vehicle. Vehicle yaw, roll, and pitch, relative to the horizontal north position may be included in vehicle data provided to the OEM service provider. By way of example, a vector of (lateral=− PI/6, longitudinal=PI/4, vertical=PI) corresponds to a rotation of 90 degrees to the right (East), a roll of 45 degrees along the longitudinal axis leaning left, and a pitch of 30 degrees along the lateral axis pointing upwards.

The current lane number may be estimated by the vehicle and provided in the vehicle data reported to the OEM service provider. The lanes may be numerically referenced from zero in consecutive integers starting with the lane in the direction of travel that is furthest in the direction of the passenger side of the vehicle. For example, in a left-hand drive vehicle, the right-most lane would be lane zero. A lane estimate accuracy may also be provided based on lane marker determination and position accuracy.

Vehicle Metadata

Vehicle metadata may provide information about the vehicle that is valid for the entire path of the vehicle. This includes vehicle type information and the vehicle reference point. All absolute positions (longitude/latitude) that are reported to the Sensor Data Ingestion Interface may be expected to be at the center of the vehicle. All offsets that are reported are expected to be offsets from this center point of the vehicle. Altitude that is reported to the interface are expected to be altitude on the ground (not the altitude of the location of the GPS antenna). Instead of providing the altitude on the ground, it is possible to report a different altitude with a constant offset. This offset from the ground must be provided through the vehicle metadata.

The generic vehicle type may be an enumeration used to provide information of what type of vehicle sensor data is being produced. This vehicle type may be established by a numerical value, such as those illustrated in FIG. 6 at 420. Some of the data submitted may be very OEM or vehicle specific. For this purpose, a generic mechanism of string key value pairs may be included that allows submission of such generic information. Based on information provided through such key value pairs in conjunction with individual OEM agreements different processing assumptions may be made.

The vehicle reference point delta above ground may provide the difference between the altitude values (e.g., provided by the GPS sensor) and the street level. Altitude values should always be provided at street level, and a delta or offset for a vehicle may be provided in the metadata to compensate for a GPS antenna which may be vehicle-roof mounted, for example. As noted above, vehicle height, width, length, fuel capacity, and weight, may also be included in the vehicle metadata. The fuel type may also be an enumerated data element, with different values representing gasoline (possible for different minimum octane ratings), diesel, natural gas (methane), battery, hydrogen, etc. Vehicles with multiple fuel sources, such as parallel or series hybrid vehicles, may have a secondary fuel capacity and secondary fuel type to indicate the additional fuel or energy they may have beyond the primary fuel amount.

The transmission mode, as noted above, may include the gear and torque converter state, but may be more high level, indicating automatic transmission states such as park, neutral, drive, and reverse, or the current gear number for example. These states may be enumerated such that a different number in the data in the transmission mode position or field corresponds to the transmission state type. The ignition state data may optionally be included to identify whether the ignition is on, off, or in an accessory mode, for example. Similarly, the engine state may be provided as to whether the engine is running, the engine is stopped, the engine is in an idle mode, the engine speed (revolutions per minute), the engine is stopped while a vehicle is stopped at a traffic light, etc. The engine speed may be identified along with an engine torque (estimated based on throttle position and engine speed), or the engine load as estimated by the mass air flow through a throttle body relative to engine capacity.

Door state messages may optionally be provided that provide an identification of a door (e.g., front driver, front passenger, rear right, rear left, trunk, bonnet, etc.) and whether the door is open or has been opened within a predetermined time period. A door lock state may optionally be provided for all of the doors or for individual doors.

As also noted above, the light state may be a bit field that encodes which lights of the vehicle are on or off. The bit field may communicate this information as shown in element 425 of FIG. 6. A bit field indicator for this data element may be more appropriate than a single number enumeration as multiple lights can be on simultaneously resulting in a large number of possible combinations of light states. The windshield wiper state may be enumerated with different values representing different wiper states, such as wiping off, wiping slow, wiping medium, wiping fast, and wiping interval, for example. In an embodiment in which a rear wiper may be involved, that wiper status may be one of ignored, separately reported in the data elements, or combined with the windshield wiper status in a bit field type of encoding. Wiper speed may also be indicated in the data element(s) regarding the wiper status in, for example, a wipes per minute value.

The fuel economy of a vehicle may be included in the data reported to the OEM service provider. The fuel economy may be reported in miles per gallon or kilometers per liter, for example. The volume of fuel in the vehicle may also be included in the data elements reported. The range of the vehicle may be calculated at the vehicle and reported, or it may be calculated at the OEM service provider or map data service provider, for example.

Another element of information that may be included in the vehicle data is related to onboard diagnostics and the status of various service-related parameters. FIG. 7 illustrates a sampling of diagnostic data which may be enumerated in vehicle data provided to the OEM service provider. However, other information may optionally be included, such as error codes or "P-codes" related to On-Board Diagnostics II (OBD-II) common to all vehicles produced since 1996, or any such diagnostic codes from proprietary software. These diagnostic codes may provide detail on the dynamic performance of a vehicle, such as a vehicle traveling relatively slowly for a particular roadway may have a diagnostic code indicating that the vehicle is in a "limp-home" mode limiting the power and gearing available to the driver, clarifying to the OEM service provider and map data service provider that the speed is not related to traffic or environmental conditions.

Vehicle dynamics may also be measured by sensors of the vehicle and reported in vehicle data provided to the OEM service provider and/or map data service provider. Vehicle dynamics including, but not limited to, speed, acceleration (lateral and longitudinal), turn angle (via steering wheel angle or front wheel angle), suspension travel, brake force, etc. Vehicle dynamics may also include average dynamics, such as an average acceleration vector, average speed vector, or average rotation rate vector, for example, where the average may be over a short period of time (e.g., 1 second) or over a longer period of time (e.g., 1 minute). Vehicle dynamics may optionally include a bank angle at which the vehicle is inclined about its longitudinal axis with respect to the horizontal. A negative value may imply an inclination to the left, while a positive value may imply an inclination to the right. Steering wheel angle and steering wheel accuracy may optionally be identified, such as through an angular measure relative to straight. The steering wheel angle change, rate of change, and accuracy of the change may be identified, along with an accelerator pedal position (e.g., 0 is no pedal depression, 1 is full pedal depression), brake pedal position, clutch pedal position, etc.

The detection of a road sign through image recognition noted above may determine a road sign type and enumerate the value according to a table of road sign types. Road sign types may include any common road sign, such as speed limit signs, stop signs, one-way signs, do not enter signs, animal crossing signs, school zone signs, construction signs, etc. Each sign may have a unique number associated with it in a stored array such that the sign can be identified in the data by number. Road signs may optionally include a value, such as a speed limit, a maximum vehicle height, or a maximum vehicle weight, for example. Further, road signs may have a dependency, such as only applicable during school hours for a school zone sign, or only applicable during winter for a snow-chains required sign.

Vehicle data provided to an OEM service provider may also be related to a vehicle crash, such that all sensor data related to the crash may be quickly communicated to the OEM service provider. For example, in the event an airbag is deployed, the airbag type and location may be included in the vehicle data. The airbags of a vehicle may each be enumerated such that those that are deployed may be readily communicated, or they may be represented in a bit field. If it is established by the vehicle that the vehicle is drivable, that data may be provided in the form of a flag (drivable/not drivable). If an emergency call is activated by the vehicle that information may be provided in the data as a true/false flag. Further, data about the crash may be provided including maximum acceleration values and/or a maximum acceleration in a three-dimensional vector to indicate which region of the vehicle was struck and what the injuries may potentially include.

Dynamic vehicle data that may be relevant to a vehicle crash or may be relevant to alert other drives in order to avoid a vehicle crash may include when a traction control event occurs (e.g., a true/false flag), an antilock braking event occurring, an electronic stability control event occurring, etc.

Environmental conditions may optionally be included in vehicle data provided to the OEM service provider as noted above. Environmental conditions may include the light conditions, and various light conditions may be enumerated as illustrated in FIG. 8. This may provide a concise manner of communicating a sensed ambient light condition of the vehicle. Precipitation may also be provided in an enumerated representation, such as with different numbers representing no precipitation, rain, hail, snow, sleet, or a wintery mix of precipitation, for example. Similarly, the road surface type may be represented by a numerical value from a reference table indicating asphalt, concrete, gravel, ice or snow, grass, dirt, etc., each having a different reference value for inclusion in the data.

Embodiments described herein may optionally include vehicles having sensors capable of detecting objects in or around a roadway, and communicating those objects as accurately as possible. Objects may be established by a vehicle through a comparison of an object profile with a database, and matching the object to a known object type. The known object types may be enumerated in a table such that the object type can be communicated quickly and easily numerically in the data provided from the vehicle to the OEM service provider, and in turn to the map data service provider. Object size may be separately communicated, along with distance (e.g., using a three dimensional vector) from the estimated position of the vehicle.

According to some embodiments, data pertaining to abnormal environmental events may be established, such as an observed event, such as road construction, a vehicle accident, wrong way driving, adverse weather conditions, etc. Traffic conditions resulting from events may be established and identified as one of a variety of levels of traffic congestion increasing, decreasing, or remaining constant. Each established event may optionally include a sub-cause, such as an accident may include a sub-cause of an accident involving a large truck, an accident involving injuries, or the like. A road work sub cause may include major road work, minor road work, street cleaning, etc. Adverse weather condition sub-causes may include snow on road, ice on road, fuel on road, conditions suitable for ice on roadways, etc.

While conventional vehicles are controlled by the driver who dictates acceleration, braking, steering, etc., vehicle technology is moving toward semi-autonomous and fully-autonomous vehicles, with various levels of driver assistance. Features such as adaptive cruise control which maintain a distance from a vehicle that is followed, or active lane assistance which urges steering back into a lane when lane departure is detected without a turn signal. These and various other autonomous and semi-autonomous driving features may be included in vehicle data that is communicated from the vehicle to the OEM service provider and to the map data service provider. Such data elements may include a speed component, bake component, and steering component, for example, where a flag (true/false) may indicate whether the various components are being controlled by a driver or by an autonomous assistance device.

The aforementioned data elements may be included in data that is sent from a vehicle to an OEM service provider and then to a map data service provider as illustrated in FIG. 3. However, not all of the data elements are required. In some instances, certain data elements described above may not be available for a vehicle, such as autonomous driving related data, or certain vehicles may lack sensors to detect various data elements, such as precipitation. As such, messages sent from the vehicle including data elements may include only a subset of the aforementioned data elements.

Further, certain messages from a vehicle may omit some available data elements in messages to the OEM service provider based on the type of message being sent. For example, in an instance in which a vehicle detects an emergency condition, such as the deployment of airbags, or the detection of a crash event, a message from the vehicle to the OEM service provider may include only the data elements pertinent to a message indicative of that event. Those data elements may include a timestamp, a location estimate, and the sensor data related to the emergency event. Conversely, data messages that are not time sensitive, such as messages including drive cycle data for a vehicle for an entire drive cycle, may include all data relevant to the drive cycle, and may be communicated to the OEM service provider periodically, such as daily, hourly, etc., or when a secure connection is established through an efficient data communication channel, such as a WiFi network.

Path

The fundamental data element for rich data sensor submission is a path. A path is a list of position estimates. The position estimates may be ordered starting with the oldest position estimate towards the newest position estimate. A path can be very short, for example for near real time events which are transmitted immediately after they occur, such as the aforementioned emergency event or crash event. A path can also be very long, for example an entire drive cycle over many hours that records the vehicle trace and events for later submission. FIG. 9 illustrates an example path 450 including position estimates 440. Callout 460 illustrates some basic elements of a position estimate required to generate the path, including the timestamp in UTC time, the longitude, latitude, and altitude, and the type of position estimate such that an accuracy can be estimated.

FIG. 10 illustrates another example embodiment of path estimation using a mixture of position estimates of different position types. As shown, some position estimates along the roadway 500 are raw GPS position estimates as shown at 505, while others are filtered GPS position estimates as shown at 515, and still others are map-matched on a map from a map service provider as shown at 510. While each position estimate may be from a vehicle traveling along path 520, the raw GPS position estimates 505 have the lowest accuracy appearing outside of the lane of travel of the route. Filtered GPS position estimates 515, while having greater accuracy than the raw GPS position estimates, are not as accurate as the map-matched GPS position estimates 510, which closely match the actual path traveled.

Along a path generated from position estimates, path events may be recorded by the sensors of a vehicle for inclusion in data regarding the path. Path events provide additional information along the path. This information may be singular events, such as a change of vehicle operation mode, or information about an electronic stability event, or the like. It may also be continuously collected information such as velocity or curvature measurements. Path events are of different types and may be mixed in the path events list. Path events may reference the path based on the timestamp of each path event. The timestamp may not exactly match a timestamp in the path of a position estimate, such that the timestamp may be used to interpolate between two path position estimates including at least one before the timestamp of the position estimate, and at least one after the timestamp of the position estimate. The interpolation may be performed, for example, at the map data service provider. FIG. 11 illustrates an example embodiment of a path 540 including position estimates represented by the dots along the path, and path events 550 occurring along the path, including sensed slope or grade, wheel slip events, sign recognition events, etc. Those events not occurring at a timestamp corresponding to a position estimate may be determined to occur at a position estimate interpolated between position estimates along the path.

Path events may be optional in the sensor data submission message from the vehicle. A path itself may provide useful data such that path events may not be required for certain types of data processing and analysis. However, the path events may be used for rich sensor data acquisition and analysis of travel along routes. Path events may be included in the sensor message from the vehicle as a list of path events. Path events may be ordered starting with the oldest path event towards the newest path event, such that they are not necessarily grouped by path event type.

A path event may be a complex data type, which has a number of mandatory and optional components. Vehicles may be configured to report components consistently. For example, if the vehicle is reporting transmission mode and temperature as part of the vehicle status data complex, then it must report these two data elements at the beginning of the path initially. Whenever the transmission mode is changing, another path event must be reported that indicates the transmission mode in the vehicle status data complex. If two path events are reported at the exact same timestamp, then all information can be merged into a combined path event provided the events do not have conflicting information. FIG. 12 illustrates an example embodiment of path events that may be included in a vehicle sensor data submission message. Each path event type may have a plurality of individual path events, and certain path event types may or may not be included.

Optionally, path media may be provided in a vehicle sensor data submission message. Path media may be images, audio, or video captured by sensors of a vehicle along a path or portion of a path. Path media may include content requested at a certain location by a map data service provider. Path media may be provided in a manner similar to path events, with timestamps for which a position of the media along the path may be interpolated between position estimates.

Vehicle Sensor Data Submission Messages

Vehicles may have different collection policies for different types of sensor dat. Relatively static information may be collected for a longer period of time and then submitted while time critical events may be submitted without delay.

For delayed or batch submission position estimates may be recorded during an entire drive cycle (e.g., from vehicle start until vehicle stop/engine off). Should there be a need for gaps in the path for privacy reasons, then the path may be separated into individual parts before the gap and after the gap. The two individual parts would be treated as two separate paths. For example, in order to maintain privacy, vehicle sensor data may be scrubbed from a path in order to ensure a third party data recipient cannot identify an individual vehicle uniquely. One such example mechanism for ensuring vehicle anonymity is described herein. An individual may drive to and from work on a daily basis with a relatively repeatable schedule. The vehicle remains parked at an office complex during the day, and parked in a driveway or garage at a residence overnight. The identity of the vehicle or owner may be readily apparent if one were to have data regarding the position of the vehicle overnight. As such, when the vehicle sensor data submission message is provided to the OEM service provider, the service provider may discern from the data that the vehicle returns to a residential location and remains there for a prolonged period. The OEM service provider 230, in the anonymization 234 may eliminate the portion of the path from a predefined distance or time before the vehicle arrived at the residential location. While the vehicle path at the beginning of a day may routinely end at an office complex, the office complex may include parking for hundreds of vehicles, such that the location of such an arrival may not require anonymization given the relative anonymity of being among a plurality of other vehicles. In this manner, the portion of the path proximate the residence of the vehicle owner may be eliminated during anonymization, while the portion of the path proximate the office complex may not require elimination.

According to some embodiments, data elements may be added to a path when a change occurs. For example, if the status of the lights of a vehicle changes during a drive cycle, then a vehicle status path event may be added. At the beginning of a path such information may also be provided independent of whether the information just changed or not. This information would be added at the beginning of the path as a path event to provide a baseline of vehicle status ahead of the drive cycle.

For delayed submission, some of the data elements described herein may not be critical to be included. For example, an exceptional vehicle state may be of real time nature, and not necessarily pertinent to the history of an entire drive cycle. However, it may be desirable to collect all available data as path events to be included in the delayed/batch vehicle sensor data submission message such that an analysis can be performed on the data to determine areas where certain events may occur frequently.

Near real-time submissions of vehicle sensor data messages may include paths that are very short, and may be triggered by events in the vehicle that result in the creation of a specific path event. For example, a speed limit sign may be recognized which results in the creation of a sign recognition path event. This may result in the need to immediately send this information from the vehicle to the OEM service provider to the map data service provider. In such cases, a short path may be included which is referenced by the path event(s). This path may start, for example, at ten position estimates and/or a predefined distance (e.g., 100 meters) before the actual event, and may include, for example, two position estimates after the event. This inclusion of a path portion for the path event may provide context that facilitates better understanding and improved accuracy of analysis of the path event. For small paths, it may be important that at the beginning of the path all available sensor information is provided regardless of whether it changes during the path to enable greater flexibility of data analysis at the map data service provider.

FIGS. 13 and 14 illustrate flowcharts illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 13 illustrates a method of gathering and processing sensor data from a vehicle for the creation of a vehicle path and path events according to an example embodiment of the present invention. As shown, the method may include receiving a plurality of estimated position points at 610, where each estimated position point may include a timestamp and an estimate of the position of a vehicle at a time corresponding to the timestamp. At 620, one or more path events may be received, where each of the one or more path events may include a timestamp and data from at least one sensor of the vehicle. A path may be generated from the plurality of estimated position points, as shown at 630, where the estimated position points may be arranged in order of ascending time represented by the respective timestamp. At 640, a location corresponding to one or more path events may be determined by interpolating between two estimated position points, where the two estimated position points are determined as having a timestamp after the path event and a timestamp before the path event, respectively.

FIG. 14 illustrates a method of gathering and processing sensor data from a vehicle for the creation of a vehicle path and path events according to another example embodiment of the present invention. The method may include receiving sensor data from a vehicle as illustrated at 710. The sensor data may include, for example, position estimations with timestamps. The data may also include data that can potentially identify the vehicle from which the data came. The sensor data may be anonymized at 720. At 730, an analysis is performed to determine if additional measures are to be taken with respect to the sensor data to protect privacy. At 740, sensor data is redacted in response to determining that additional measures are to be taken with respect to the sensor data to protect privacy. At 750, the sensor data is provided to the service provider if no additional measures are required with respect to protection of privacy. If additional measures are required to protect privacy, the redacted sensor data may be provided to the service provider at 760.

In an example embodiment, an apparatus for performing the method of FIG. 13 above may comprise a processor (e.g., the processor 202) configured to perform some or each of the operations (610-640 and 710-760) described above. The processor may, for example, be configured to perform the operations (610-640 and 710-760) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 610-640 and 710-760 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a plurality of estimated position points, each estimated position point including a timestamp, wherein each estimated position point is an estimate of a position of a vehicle at a time represented by the respective timestamp;
   receiving one or more path events, wherein each of the one or more path events includes a timestamp and data from at least one sensor of the vehicle, wherein the plurality of estimated position points and the one or more path events are received in a vehicle sensor data submission message, wherein the vehicle sensor data submission message comprises vehicle identifying information;
   anonymizing the vehicle sensor data submission message, wherein anonymizing the vehicle sensor data submission message comprises dividing the plurality of estimated position points between a first path segment, a second path segment, and a gap path segment between the first path segment and the second path segment;
   determining a priority of sensor data of the one or more path events, wherein determination of the priority of the sensor data is based, at least in part, on criticality of timing of the sensor data;
   generating a path from the plurality of estimated position points, wherein the estimated position points are arranged in order of ascending time represented by the respective timestamp, wherein generating the path from the plurality of estimated position points comprises generating a first path from the first path segment, generating a second path from the second path segment, and eliminating the gap path segment;
   interpolating between two of the estimated position points to determine a location corresponding to one of the one or more path events, where the timestamp of the one of the one or more path events corresponds to a time that is between the times represented by the timestamps of the two of the estimated position points; and
   providing location-based services corresponding to the one or more path events from a location-based service provider,
   wherein receiving the plurality of estimated position points comprises:
      receiving a plurality of estimated position points for a subset of a drive cycle in response to a path event requiring real-time or near real-time submission, wherein the path event requiring real-time or near real-time submission comprises a vehicle crash detected by a three-dimensional acceleration vector exceeding a maximum acceleration, wherein providing location-based services corresponding to the one or more path events comprises automatically transmitting a crash event message including crash information responsive to the one or more path event, wherein the crash information comprises an indication of which region of the vehicle was struck based on the three-dimensional acceleration vector and an indication of potential injuries resulting from the vehicle crash.

2. The method of claim 1, wherein at least one of the one or more path events comprises a sensed vehicle status, environmental condition, or vehicle dynamic event.

3. The method of claim 1, further comprising:
   aligning the path with a map representing the geography of available vehicle routes.

4. The method of claim 1, wherein the path events include changes to at least one of vehicle status, vehicle dynamics, or environmental status, or at least one of a sign recognition event, lane boundary recognition event, exceptional vehicle event, or object detection event.

5. The method of claim, 1 wherein the location-based services corresponding to the one or more path events further comprise route guidance calculated based on the one or more path events and corresponding locations of the one or more path events.

6. An apparatus comprising at least one processor and at least one memory including computer program code, the at least one memory and computer program code configured to, with the at least one processor, cause the apparatus to at least:
receive a plurality of estimated position points, each estimated position point including a timestamp, wherein each estimated position point is an estimate of a position of a vehicle at a time represented by the respective timestamp;
receive one or more path events, wherein each of the one or more path events includes a timestamp and data from at least one sensor of the vehicle, wherein the plurality of estimated position points and the one or more path events are received in a vehicle sensor data submission message, wherein the vehicle sensor data submission message comprises vehicle identifying information;
anonymize the vehicle sensor data submission message, wherein causing the apparatus to anonymize the vehicle sensor data submission message comprises causing the apparatus to divide the plurality of estimated position points between a first path segment, a second path segment, and a gap path segment between the first path segment and the second path segment;
determine a priority of sensor data of the one or more path events, wherein determination of the priority of the sensor data is based, at least in part, on criticality of timing of the sensor data;
generate a path from the plurality of estimated position points, wherein the estimated position points are arranged in order of ascending time represented by the respective timestamp, wherein causing the apparatus to generate the path from the plurality of estimated position points comprises causing the apparatus to generate a first path from the first path segment, generating a second path from the second path segment, and eliminating the gap path segment;
interpolate between two of the estimated position points to determine a location corresponding to one of the one or more path events, where the timestamp of the one of the one or more path events corresponds to a time that is between the times represented by the timestamps of the two of the estimated position points; and
provide location-based services corresponding to the one or more path events from a location-based service provider,
wherein causing the apparatus to receive the plurality of estimated position points comprises causing the apparatus to:
receive a plurality of estimated position points for a subset of a drive cycle in response to a path event requiring real-time or near real-time submission, wherein the path event requiring real-time or near real-time submission comprises a vehicle crash detected by a three-dimensional acceleration vector exceeding a maximum acceleration, wherein providing location-based services corresponding to the one or more path events comprises automatically transmitting a crash event message including crash information responsive to the one or more path event, wherein the crash information comprises an indication of which region of the vehicle was struck based on the three-dimensional acceleration vector and an indication of potential injuries resulting from the vehicle crash.

7. The apparatus of claim 6, wherein at least one of the one or more path events comprises a sensed vehicle status, environmental condition, or vehicle dynamic event.

8. The apparatus of claim 6, wherein the apparatus is further configured to:
align the path with a map representing the geography of available vehicle routes.

9. The apparatus of claim 6, wherein the path events include changes to at least one of vehicle status, vehicle dynamics, or environmental status, or at least one of a sign recognition event, lane boundary recognition event, exceptional vehicle event, or object detection event.

10. The apparatus of claim 6, wherein the location-based services corresponding to the one or more path events further comprise route guidance calculated based on the one or more path events and corresponding locations of the one or more path events.

11. A computer program product comprising at least one non-transitory computer-readable storage medium having computer-executable program code portions stored therein, the computer-executable program code portions comprising program code instructions configured to:
receive a plurality of estimated position points, each estimated position point including a timestamp, wherein each estimated position point is an estimate of a position of a vehicle at a time represented by the respective timestamp;
receive one or more path events, wherein each of the one or more path events includes a timestamp and data from at least one sensor of the vehicle, wherein the plurality of estimated position points and the one or more path events are received in a vehicle sensor data submission message, wherein the vehicle sensor data submission message comprises vehicle identifying information;
anonymize the vehicle sensor data submission message, wherein the program code instructions to anonymize the vehicle sensor data submission message comprise program code instructions to divide the plurality of estimated position points between a first path segment, a second path segment, and a gap path segment between the first path segment and the second path segment;
determine a priority of sensor data of the one or more path events, wherein determination of the priority of the sensor data is based, at least in part, on criticality of timing of the sensor data;
generate a path from the plurality of estimated position points, wherein the estimated position points are arranged in order of ascending time represented by the respective timestamp, wherein the program code instructions to generate the path from the plurality of estimated position points comprise program code instructions to generate a first path from the first path segment, generate a second path from the second path segment, and eliminate the gap path segment;
interpolate between two of the estimated position points to determine a location corresponding to one of the one or more path events, where the timestamp of the one of the one or more path events corresponds to a time that is between the times represented by the timestamps of the two of the estimated position points; and
provide location-based services corresponding to the one or more path events from a location-based service provider, wherein the program code instructions configured to receive the plurality of estimated position points comprise program code instructions configured to:

receive a plurality of estimated position points for a subset of a drive cycle in response to a path event requiring real-time or near real-time submission, wherein the path event requiring real-time or near real-time submission comprises a vehicle crash detected by a three-dimensional acceleration vector exceeding a maximum acceleration, wherein providing location-based services corresponding to the one or more path events comprises automatically transmitting a crash event message including crash information responsive to the one or more path event, wherein the crash information comprises an indication of which region of the vehicle was struck based on the three-dimensional acceleration vector and an indication of potential injuries resulting from the vehicle crash.

12. The computer program product of claim 11, wherein at least one of the one or more path events comprises a sensed vehicle status, environmental condition, or vehicle dynamic event.

13. The computer program product of claim 11, further comprising program code instructions configured to:
align the path with a map representing the geography of available vehicle routes.

14. The computer program product of claim 11, wherein the path events include changes to at least one of vehicle status, vehicle dynamics, or environmental status, or at least one of a sign recognition event, lane boundary recognition event, exceptional vehicle event, or object detection event.

15. The computer program product of claim 11, wherein the location-based services corresponding to the one or more path events further comprise route guidance calculated based on the one or more path events and corresponding locations of the one or more path events.

* * * * *